United States Patent [19]

Chung et al.

[11] Patent Number: 4,550,391
[45] Date of Patent: Oct. 29, 1985

[54] DATA CAPTURE WINDOW EXTENSION CIRCUIT

[75] Inventors: Randall Chung, Laguna Niguel; William Ambrosius, III, Mission Viejo, both of Calif.

[73] Assignee: Western Digital Corporation, Irvine, Calif.

[21] Appl. No.: 468,129

[22] Filed: Feb. 22, 1983

[51] Int. Cl.⁴ .............................................. G11C 8/00
[52] U.S. Cl. ..................................... 365/233; 360/51
[58] Field of Search ........................... 360/51; 370/77; 375/111, 38, 95; 328/63, 152, 72; 455/59; 365/233

[56] References Cited

U.S. PATENT DOCUMENTS 3,414,889 12/1968 Higgins et al. ...................... 365/233

Primary Examiner—Raymond F. Cardillo, Jr.
Assistant Examiner—Alyssa H. Bowler
Attorney, Agent, or Firm—Spensley, Horn, Jubas & Lubitz

[57] ABSTRACT

A digital data capture window extension circuit utilizing a matched pair of signal detection subcircuits that are activated during alternate cycles of a master read clock. The interleaved operation of the paired subcircuits permits each subcircuit to detect and process an incoming data signal, resulting in an effective overall processing rate twice that of prior art circuitry. The invention therefore permits the reading of data at a high rate using a system clock of the same frequency as the incoming data.

4 Claims, 4 Drawing Figures

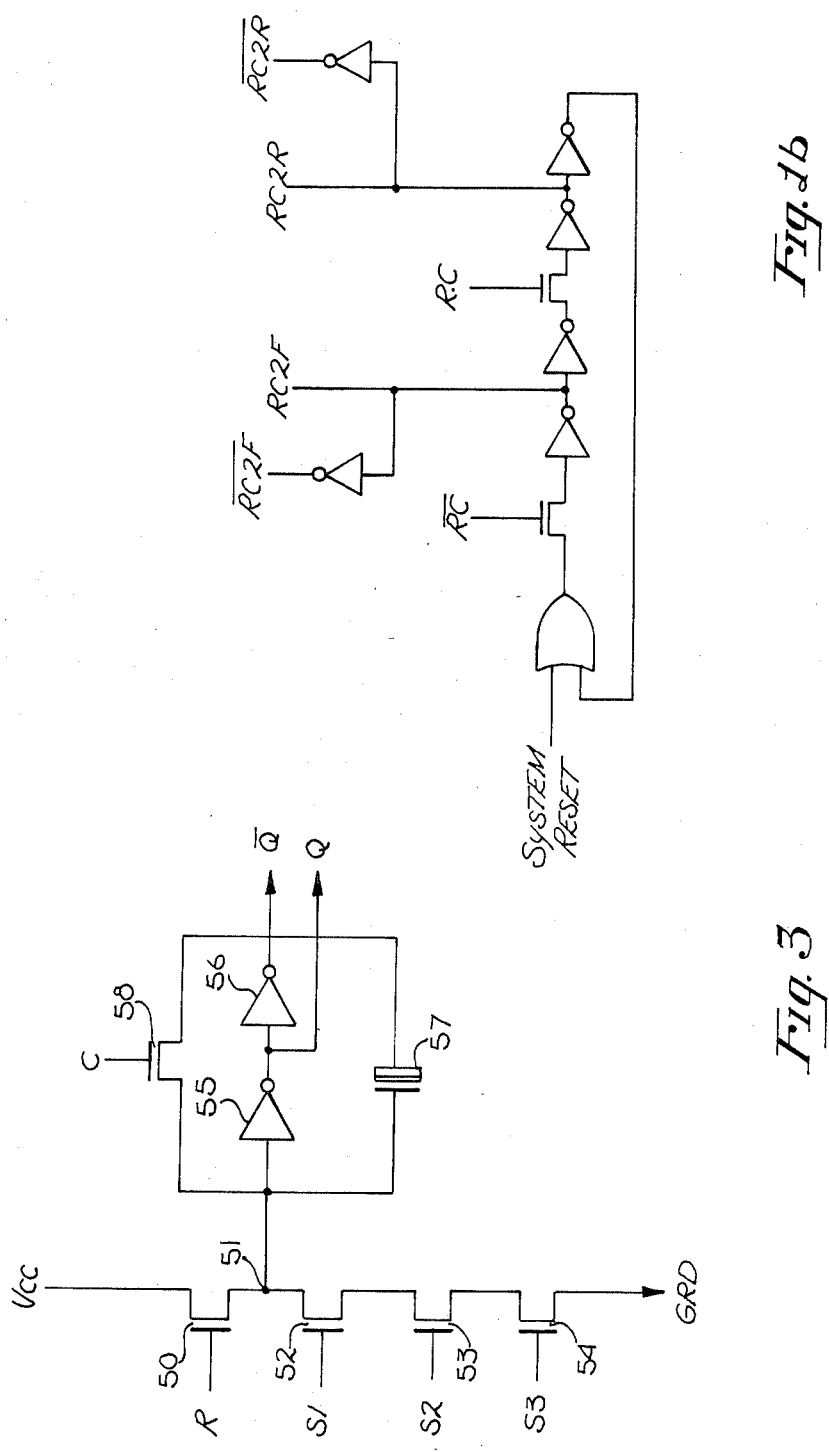

TIME PERIOD: T1 T2 T3 T4 T1 T2 T3 T4 T1 T2 T3 T4

RC $\overline{RC}$

SYSTEM RESET

RC2F

RC2R

AND GATE 7

AND GATE 8

AND GATE 11

AND GATE 12

DATA CAPTURE WINDOW EXTENSION CIRCUIT

BACKGROUND OF THE INVENTION

This invention relates to digital data capture circuits, and more particularly to a data capture window extension circuit having a clock rate equal to the data rate.

In many instances in digital electronics, it is necessary to detect the presence of an input signal at a particular moment in time. For example, in magnetic disc storage technology, several coding methods have been developed for use in storing data on rigid or floppy magnetic discs. These coding methods include frequency modulation and modified frequency modulation. In these coding schemes, actual data and clock signals are combined into one signal (Read Data) and recorded on the magnetic disc. In order to read this recorded signal back, electronic controller circuitry especially adapted for detecting the presence of the combined read/clock signal has been used in the past.

The prior art typically requires a system clock for the controller circuitry that operates at a rate twice that of the Read Data ("RD") to be detected from the disc. However, as the frequency of data recording increases in disc devices (particularly in the recent Winchester rigid disc technology), the speed limitations of the metal oxide semiconductor ("MOS") technology typically used in the controller circuits is pressed to its limits and at times exceeded. At present, many Winchester-type discs record the combined clock/data signal at a frequency of five megahertz. The prior art would require controller circuitry operating at ten megahertz in order to read this information.

The present invention consists of a circuit that permits the detection and capture of Read Data at a particular rate using only a system Read Clock ("RC") operating at an equal rate. Thus, a read data signal recorded at five megahertz would require only a five megahertz Read Clock. The lower frequency Read Clock necessary to operate the detection circuitry permits the circuit to be easily fabricated using standard MOS technology.

It is therefore an object of this invention to provide a new and improved digital data capture window extension circuit that permits reading data at a high rate using a system clock that matches the frequency of the incoming data.

SUMMARY OF THE INVENTION

The present invention provides a digital data capture window extension circuit. For purposes of clarity only, the preferred embodiment of the invention is described in the context of its use in a magnetic disc data controller circuit.

The invention provides a matched pair of signal detection subcircuits that are activated during alternate cycles of the Read Clock. The interleaved operation of the paired subcircuits permits each subcircuit a total of two Read Clock cycles to detect and process an incoming Read Data signal. In an ideal circuit, the incoming Read Data is perfectly synchronized with the Read Clock. However, because of imprecision in the various circuits that the Read Data and the Read Clock are processed or affected by, a phase difference may occur between the two signals. The phase difference between Read Data and Read Clock in fact may vary with time, as various circuit parameters change and because of the occurrence of variations that relate to the recorded signal on the magnetic disc itself.

The rising edge of Read Data is nominally in the center of the Read Clock period. Normally, the controller circuitry has a "capture window", equal to the time between the rising edge of Read Clock and the falling edge of Read Clock, in which to detect the occurrence of the Read Data signal. Thereafter, the controller circuit has an "operation window", for further processing of the Read Data signal, that extends only through the next one-half cycle of the Read Clock. If the rising edge of the Read Data signal occurs too close in time to the falling edge of the Read Clock, the controller circuit may not properly "capture" the Read Data signal, or "capture" it too late to have adequate time to further process the signal. Hence, an erroneous logic state may be propagated to the remainder of the controller circuitry.

The present invention extends the "operation window" from one Read Clock half-cycle to two or three Read Clock half-cycles by alternating between a pair of data capture circuits. When one circuit is "capturing" data, the other circuit is processing its previously captured data, and vice versa in the next time cycle.

If the prior art were used with a five megahertz Winchester technology magnetic disc, the data capture circuit would have approximately 100 nanoseconds to capture and process the data. With the present invention, the controller circuit has approximately 400 nanoseconds to capture and process the data signal.

DESCRIPTION OF THE DRAWINGS

The invention will become better understood by reference to the following detailed description when taken in conjunction with the accompanying drawings showing the preferred embodiment of the invention.

FIG. 1B is a schematic logic diagram of a subsidiary clock generator circuit used in the preferred embodiment of the present invention.

FIG. 3 is a schematic diagram of the specialized logic flip-flops used in the present invention.

DESCRIPTION OF THE PREFERRED EMBODIMENT

Figure 1A:
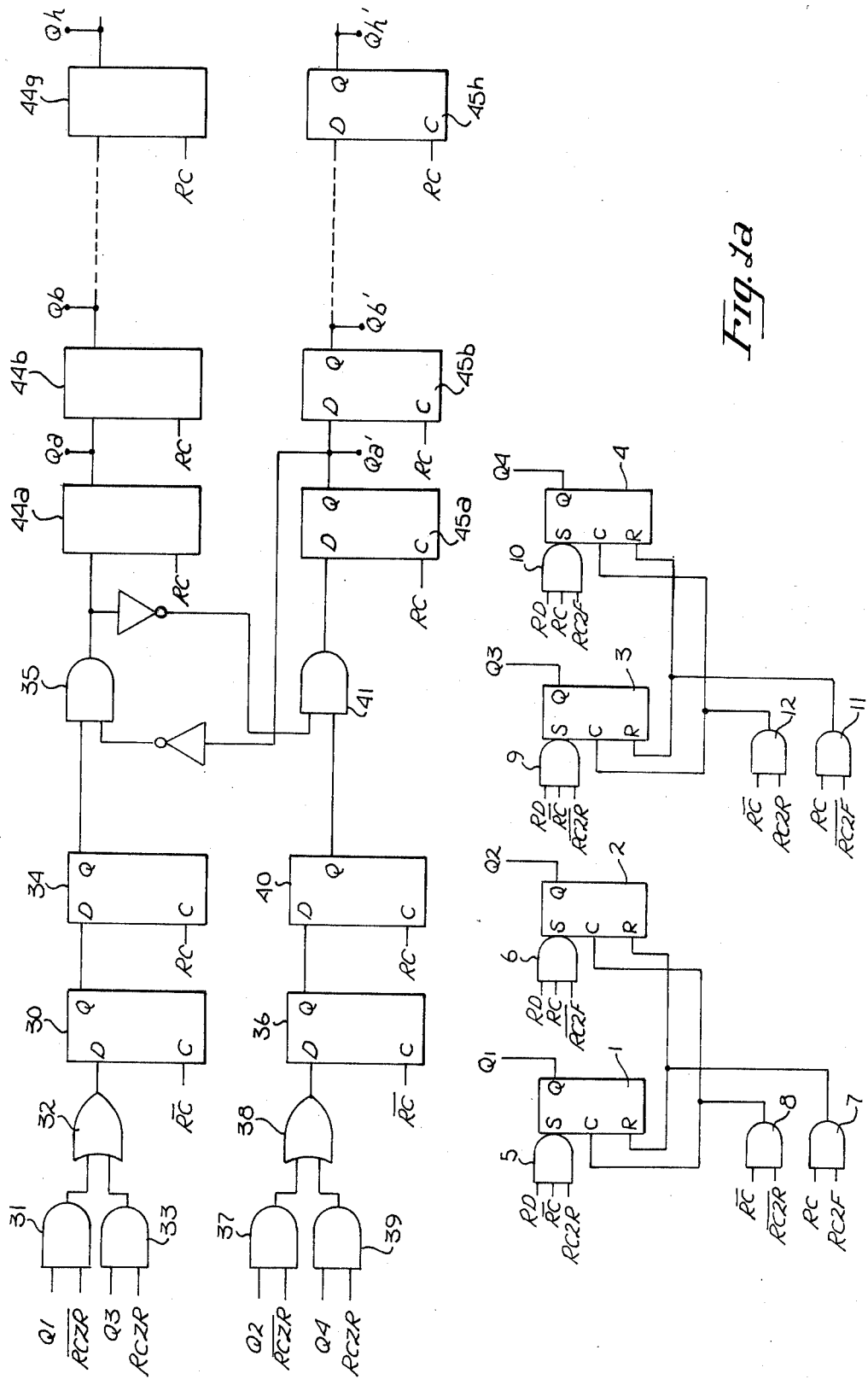
FIG. 1A is a schematic logic diagram of the data capture window extension circuit of the present invention.

Referring to FIG. 1A, four set-reset flip-flops are shown configured in two pairs of two each. Flip-flops 1 and 2 comprise a first pair of flip-flops for processing a Read Data signal. Flip-flops 3 and 4 comprise a second pair of flip-flops for processing a Read Data signal.

Figure 2:
FIG. 2 is a timing diagram showing the phase relationship of the various signals occurring in the present invention.
Figure 2:
Figure 2:
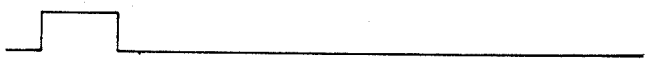
Figure 2:
Figure 2:
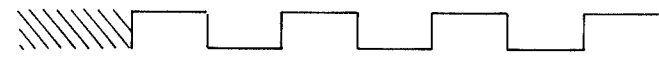
Figure 2:
Figure 2:
Figure 2:
Figure 2:

FIG. 2 shows a timing diagram of the various signals used in the present invention. Two timing signals, RC2F and RC2R, and their inverses, $\overline{RC2F}$ and $\overline{RC2R}$, are generated by the clock circuit shown in FIG. 1B, which is simply an inverter ring circuit gated by the Read Clock RC signal and its inverse, $\overline{RC}$. These additional signals are one-half the frequency of the Read Clock signal, and RC2F is phase-shifted from RC2R by one-half of an RC cycle. By logically combining RC, $\overline{RC}$, RC2F, $\overline{RC2F}$, RC2R, and $\overline{RC2R}$ in various combinations, four cyclic time periods (T1, T2, T3, and T4) are defined.

Again referring to FIG. 1A, flip-flop 1 can be set only if the Read Data RD signal is a logical one during time period T1. Flip-flop 2 can only be set if the Read Data signal is a logical one during time period T2. Both flip-flops 1 and 2 are reset during time period T4, by means of AND gate 7.

The outputs of flip-flops 1 and 2 are Q1 and Q2, respectively. Due to the nature of the set-reset flip-flop circuit used in the present invention (as explained in greater detail below), the Q1 and Q2 outputs are clearly valid during time T3, but also may become valid during times T1 and T2, respectively.

Flip-flops 3 and 4 are essentially identical in structure to flip-flops 1 and 2, respectively. Flip-flop 3 may be set only during time period T3, while flip-flop 4 may be set only during time period T4. Both flip-flops 3 and 4 are reset during time period T2, by means of AND gate 11.

The outputs of flip-flops 3 and 4 are Q3 and Q4, respectively. Due to the nature of the set-reset flip-flop circuit used in the present invention (as explained in greater detail below), the Q3 and Q4 outputs are clearly valid during time T1, but also may become valid during times T3 and T4, respectively.

Referring again now to FIG. 1A, data (or "D-type") flip-flop 30 will accept a logical one input (through AND gate 31 and OR gate 32) whenever the Q1 output of flip-flop 1 is a logical one during time period T3 (thus indicating that the Read Data signal was a logical one during time period T1). Alternatively, D-type flip-flop 30 will accept a logical one input (through AND gate 33 and OR gate 32) whenever the Q3 output of flip-flop 3 is a logical one during time period T1 (thus indicating that the Read Data signal was a logical one during the previous time period T3). D-type flip-flop 30 is clocked by the inverse Read Clock ($\overline{RC}$) signal, and the output of that flip-flop is the input to a second D-type flip-flop 34. D-type flip-flop 34 is clocked by the RC signal and its output is an input to AND gate 35.

In similar fashion, the output Q2 of flip-flop 2 is gated (through AND gate 37 and OR gate 38) to the input of D-type flip-flop 36 during time period T3, and the output Q4 of flip-flop 4 is gated (through AND gate 39 and OR gate 38) to the input of D-type flip-flop 36 during the following time period T1. The output of D-type flip-flop 36 is the input to D-type flip-flop 40. The output of D-type flip-flop 40 is the input to AND gate 41.

The output of AND gate 35 is inverted and coupled to the input of AND gate 41. The output of AND gate 35 is also the input to D-type flip-flop 44a, which is the first of a chain of eight D-type flip-flops all clocked by the Read Clock RC. The output of AND gate 41 is the input to D-type flip-flop 45a, which is the first of a chain of nine D-type flip-flops all clocked by the Read Clock RC. The output of D-type flip-flop 45a is also inverted and coupled to the input of AND gate 35.

Referring now to FIG. 3, the schematic structure of a combination AND gate and set-reset flip-flop as used for each of the flip-flops in the preferred embodiment is shown. During a reset cycle, gate 50 is activated, and node 51 is charged from a voltage source, $V_{cc}$. At any time when all of the set gates 52, 53, 54 are activated during the same time period, node 51 will be discharged to ground. Node 51 is the input to a first inverter 55, which in turn is the input to a second inverter 56. The output of inverter 56 is the $\overline{Q}$ output of the set-reset flip-flop, while the output of inverter 55 is the Q output of the flip-flop.

Whenever node 51 is a logical one (thus meaning that the flipflop is in its "reset" state), the Q output is a logical zero. Whenever node 51 is a logical zero (thus meaning that the flip-flop is in its "set" state), the Q output is a logical one.

Device 57 is a depletion capacitor designed to enhance the ability of the inverters 55, 56 to produce an unambiguous output by acting as a feedback element. Thus, as node 51 is discharged, the $\overline{Q}$ output begins to change to a logical zero. The change in voltage at the $\overline{Q}$ output is coupled back through capacitor 57 to the input of inverter 55, which causes node 51 to be forced further towards a logical zero value.

Gate 58 is also designed to enhance the ability of the inverters 55, 56 to produce an unambiguous logic output. In flip-flops 1 and 2, the corresponding gate 58 is activated by AND gate 8 during time period T3. In flip-flops 3 and 4, the corresponding gate 58 is activated by AND gate 12 during time period T1. Gate 58 causes the flip-flop circuit to function as follows. As node 51 begins to discharge (thus indicating that the set-reset flip-flop is being changed to its "set" state), the $\overline{Q}$ output begins to change to a logical zero. During the appropriate activation time period, gate 58 couples the $\overline{Q}$ output to node 51, which tends to force node 51 to the same logic state as the $\overline{Q}$ output.

The particular set-reset flip-flop structure used in the preferred embodiment is not a necessary part of the invention. It has been chosen because it offers advantages of simplicity and reliability in producing unambiguous logic signals. However, other structures for the AND gate and set-reset flip-flop shown in FIG. 1A may be used without deviating from the scope and intent of the invention.

In operation, flip-flops 1, 2, 3, and 4 are activated in sequence during time periods T1, T2, T3, and T4, respectively. If an RD signal is first detected during time period T1, the Q1 output of flip-flop 1 becomes a logical one.

If Q1 is set to a logical one, the output of D-type flip-flop 30 becomes a logical one during time period T3 (due to the clocking signal $\overline{RC}$). Thereafter, the output of D-type flip-flop 34 becomes a logical one during time period T4 (due to the clocking signal RC).

If the RD signal is first detected in time period T2, flip-flop 2 is activated and output Q2 is set to a logical one. If Q2 is a logical one, the output of D-type flip-flop 36 is set to a logical one during time period T3. In turn, the output of D-type flip-flop 40 is set to a logical one during the following T4 time period.

In similar fashion, flip-flops 3 and 4 detect whether an RD signal is first detected during time periods T3 and T4, respectively, and cause D-type flip-flops 34 or 40, respectively, to be set to a logical one during the following time period T1.

The cross-coupling of AND gates 35 and 41 is designed to correct for the erroneous setting of flip-flop 1 by means of a pulse beginning in time period T4 but ending in time period T1, the erroneous setting of flip-flop 2 by means of a pulse beginning in time period T1 and ending in time period T2, the erroneous setting of flip-flop 3 by means of a pulse beginning in time period T2 and ending in time period T3, and the erroneous setting of flip-flop 4 by means of a pulse beginning in time period T3 and ending in time period T4. Any of these occurrences would be considered an illegal state because it would indicate that a RD signal was a logical one in two consecutive time periods, which for the coding schemes used in conjunction with this circuitry would be an illegal signal.

The coupling of the output of D-type flip-flop 45a to the input of AND gate 35 inhibits the output of AND gate 35 whenever flip-flops 2 or 4 have been set in the respective previous time period. On the other hand, if AND gate 35 is not so inhibited, and the outputs of flip-flops 1 or 3 are activated, the output of AND gate 41 is inhibited by the output of AND gate 35.

The effect of the inputs to AND gates 35 and 41 from D-type flip-flops 34 and 40, respectively, is to form a pattern of logic ones and zeroes in the two series of D-type flip-flops shown in FIG. 1A. These two sets of bit patterns may then be read in parallel by circuitry well-known in the prior art to decode the frequency modulation or modified frequency modulation bit coding scheme used to record the RD signal on a magnetic disc.

By comparing the parallel outputs of D-type flip-flops 44a–44g, and of 45a–45h, well-known prior art circuitry can determine whether an RD signal first occurred within time periods T1 or T3, or T2 or T4.

The effect of the paired detection circuits is that flip-flop 1 has a total of three time periods in which to detect and signify to subsequent circuitry the presence or absence of an RD signal in time period T1, and flip-flop 2 has a total of two time periods in which to detect and signify the presence or absence of an RD signal in time period T2. Flip-flops 1 and 2 are then reset in a fourth time period for a next sequence of four time periods. In similar fashion, flip-flops 3 and 4 have a total of three and two time periods, respectively, in which to detect and signify the presence of an RD signal occurring in time periods T3 and T4, respectively. Flip-flops 3 and 4 are then reset in a fourth time period for a next sequence of four time periods. The operation of flip-flops 3 and 4 is one complete RC clock cycle (two time periods) out of phase from the operation of flip-flops 1 and 2. The alternation between the paired detection circuits permits the reading of data at an effective overall processing rate twice that of prior art circuits.

While this invention has been described with reference to a preferred embodiment, it is not intended that this description be construed in a limiting sense. Various modifications of the preferred embodiment, as well as other embodiments of the invention, will be apparent to persons skilled in the art upon reference to this description. It is therefore contemplated that the appended claims will cover any modifications or embodiments as fall within the true scope of the invention.

We claim:

1. A digital data capture window extension circuit for optimizing the time available in an electronic system for detecting the presence and timing of a plurality of serial input signals from an external signal source, comprising:
   a. alternately enabled first and second circuit means, each clocked at a frequency approximately the same as the frequency of the input signals, and each for detecting the presence and timing of an input signal from the external signal source while enabled, and for indicating such presence and timing by generating at least one of two timing signals; and
   b. selection and storage means, coupled to receive the timing signals from the first and second circuit means, for storing a plurality of timing signals generated by one or both of the first and second circuit means indicative of the presence and timing of a plurality of serial input signals to one or both of the first and second circuit means.

2. A digital data capture window extension circuit for optimizing the time available in an electronic system for detecting the presence and timing of a plurality of serial input signals from an external signal source, comprising:
   a. a first circuit means for detecting the presence of an input signal in one or both of a first time period and a second time period, and for indicating such presence by generating at least one of two timing signals;
   b. a second circuit means for detecting and indicating the presence of an input signal in one or both of a third time period and a fourth time period, and for indicating such presence by generating at least one of two timing signals;
   c. a first memory means, coupled to receive the timing signals from the first and the second circuit means, for generating and temporarily storing a first output signal indicative of the presence of an input signal in the first or third time periods;
   d. a second memory means, coupled to receive the timing signals from the first and second circuit means, for generating and temporarily storing a second output signal indicative of the presence of an input signal in the second or fourth time periods; and
   e. selection and storage means, coupled to the first and second memory means, for accumulating a plurality of first and second output signals temporarily stored in the first and second memory means indicative of the presence and timing of a plurality of input signals to one or both of the first and second circuit means.

3. The digital data capture window extension circuit of claim 2, wherein the circuit is clocked at a frequency approximately the same as the frequency of the input signals.

4. A clocked digital data capture window extension circuit for optimizing the time available in an electronic system for detecting the presence and timing of a plurality of serial input signals from an external signal source having a frequency approximately the same as the clock frequency for said circuit, comprising:
   a. a first circuit means for detecting the presence of an input signal in one or both of a first time period and a second time period, and for indicating such presence by generating at least one of two timing signals;
   b. a second circuit means for detecting and indicating the presence of an input signal in one or both of a third time period and a fourth time period, and for indicating such presence by generating at least one of two timing signals;
   c. a first memory means, coupled to receive the timing signals from the first and the second circuit means, for generating and temporarily storing a first output signal indicative of the presence of an input signal in the first or third time periods;
   d. a second memory means, coupled to receive the timing signals from the first and second circuit means, for generating and temporarily storing a second output signal indicative of the presence of an input signal in the second or fourth time periods;
   e. a priority determination circuit means, coupled to the output of the first and second memory means, for inhibiting the first output signal during any time period when the second output signal was present in the prior time period, and for inhibiting the second output signal during any time period when the first output signal is present;

f. first data register means, coupled to the output of the priority determination circuit means, for accumulating a plurality of uninhibited first output signals; and g. second data register means, coupled to the output of the priority determination circuit means, for accumulating a plurality of uninhibited second output signals;

h. the plurality of accumulated first output and second output signals being indicative of the presence and timing of a plurality of input signals to one or both of the first and second circuit means.

* * * * *